United States Patent
Li et al.

(10) Patent No.: US 9,680,762 B2
(45) Date of Patent: Jun. 13, 2017

(54) METHOD AND SYSTEM FOR PROVIDING QOS FOR IN-BAND CONTROL TRAFFIC IN AN OPENFLOW NETWORK

(71) Applicant: Futurewei Technologies, Inc., Plano, TX (US)

(72) Inventors: Zhenjiang Li, San Jose, CA (US); Fangping Liu, San Jose, CA (US); Qiang Feng, HangZhou (CN)

(73) Assignee: Futurewei Technologies, Inc., Plano, TX (US)

( * ) Notice: Subject to any disclaimer, the term of this patent is extended or adjusted under 35 U.S.C. 154(b) by 346 days.

(21) Appl. No.: 14/589,248

(22) Filed: Jan. 5, 2015

(65) Prior Publication Data
US 2016/0197839 A1    Jul. 7, 2016

(51) Int. Cl.
*H04L 12/28* (2006.01)
*H04L 12/863* (2013.01)
*H04L 12/935* (2013.01)
*H04L 12/873* (2013.01)

(52) U.S. Cl.
CPC .......... *H04L 47/6295* (2013.01); *H04L 47/52* (2013.01); *H04L 49/30* (2013.01)

(58) Field of Classification Search
CPC .................................................. H04L 47/6295
USPC ........................................................ 370/392
See application file for complete search history.

(56) References Cited

U.S. PATENT DOCUMENTS

| 5,483,585 A * | 1/1996 | Parker ................. | H04M 3/2254 379/216.01 |
| 2011/0317559 A1* | 12/2011 | Kern ....................... | H04L 45/02 370/235 |
| 2014/0280791 A1* | 9/2014 | DeCusatis ............... | H04L 69/22 709/220 |
| 2015/0295852 A1* | 10/2015 | Natarajan ............... | H04L 47/80 709/225 |
| 2015/0363522 A1* | 12/2015 | Maurya ................... | H04L 43/50 703/13 |
| 2016/0323189 A1* | 11/2016 | Ahn ..................... | H04L 47/6215 |

* cited by examiner

*Primary Examiner* — Christopher R Crompton
(74) *Attorney, Agent, or Firm* — Schwegman Lundberg & Woessner, P.A.

(57) ABSTRACT

A method for guaranteeing control traffic throughput in an in-band network configured for delivering control and data traffic, and considering both local and global views of the communication network. The method includes determining an initial configuration for forwarding first control traffic from the packet forwarding device, wherein the initial configuration comprises a first in-band queue for receiving the first control traffic that is delivered over the control path to the controller via a port in the packet forwarding device, and a first bandwidth reserved for the first queue. The method includes performing handshaking with the controller by sending a request to the controller confirming the initial configuration using a network control protocol, and receiving a response from the controller in association with the request. The method includes confirming or modifying the initial configuration based on the response.

20 Claims, 6 Drawing Sheets

METHOD AND SYSTEM FOR PROVIDING QOS FOR IN-BAND CONTROL TRAFFIC IN AN OPENFLOW NETWORK

BACKGROUND

In a communications network, various nodes including computing systems are coupled. Forwarding devices, such as routers, switches and hubs working in conjunction with the computing systems enable the delivery of packets from one node to another within a network, and between nodes of located in different networks. In that manner, a packet originating at one node is delivered to its destination node via a path that may include other nodes.

Control traffic is used to manage the network. For example, control traffic may indicate how nodes are interconnected to facilitate delivery of packets throughout the network. In addition, control traffic may include status and error messaging so that problems in the network may be addressed.

If control traffic becomes undeliverable, some or all of the network may fail. This leads to data traffic throughout the network being dropped. For example, congestion across an in-band control network that shares a communication path with data may affect the delivery of control traffic. Moreover, traditional in-band control networks have minimal or no mechanisms in place for guaranteeing delivery of control traffic, and any mechanisms that do exist do not consider both local and global views of the communications network

SUMMARY

In some embodiments of the present invention, a computer system is disclosed. The computer system includes memory having stored therein computer executable instructions, and a processor executing computer-executable instructions stored in the memory. The executable instructions include establishing a connection from a packet forwarding device to a controller over a control path in an in-band network configured for delivering control and data traffic. The instructions include determining an initial configuration for forwarding first control traffic from the packet forwarding device, wherein the initial configuration comprises a first in-band queue for receiving the first control traffic that is delivered over the control path to the controller via a port in the packet forwarding device, and a first bandwidth reserved for the first queue. The instructions include performing handshaking with the controller by sending a request to the controller confirming the initial configuration using a network control protocol, and receiving a response from the controller in association with the request. The instructions include confirming or modifying the initial configuration based on the response.

In other embodiments, a method for guaranteeing control traffic throughput in a network as executed by a processor is disclosed. The method includes establishing a connection from a packet forwarding device to a controller over a control path in an in-band network configured for delivering control and data traffic. The method includes determining an initial configuration for forwarding first control traffic from the packet forwarding device, wherein the initial configuration comprises a first in-band queue for receiving the first control traffic that is delivered over the control path to the controller via a port in the packet forwarding device, and a first bandwidth reserved for the first queue. The method includes performing handshaking with the controller by sending a request to the controller confirming the initial configuration using a network control protocol, and receiving a response from the controller in association with the request. The method includes confirming or modifying the initial configuration based on the response.

In still other embodiments of the present invention, a non-transitory computer-readable medium having computer-executable instructions for causing a computer system to perform a method for guaranteeing control traffic throughput in a network as executed by a processor is disclosed. The method includes establishing a connection from a packet forwarding device to a controller over a control path in an in-band network configured for delivering control and data traffic. The method includes determining an initial configuration for forwarding first control traffic from the packet forwarding device, wherein the initial configuration comprises a first in-band queue for receiving the first control traffic that is delivered over the control path to the controller via a port in the packet forwarding device, and a first bandwidth reserved for the first queue. The method includes performing handshaking with the controller by sending a request to the controller confirming the initial configuration using a network control protocol, and receiving a response from the controller in association with the request. The method includes confirming or modifying the initial configuration based on the response.

These and other objects and advantages of the various embodiments of the present disclosure will be recognized by those of ordinary skill in the art after reading the following detailed description of the embodiments that are illustrated in the various drawing figures.

BRIEF DESCRIPTION

The accompanying drawings, which are incorporated in and form a part of this specification and in which like numerals depict like elements, illustrate embodiments of the present disclosure and, together with the description, serve to explain the principles of the disclosure.

DETAILED DESCRIPTION

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Accordingly, embodiments of the present invention provide an in-band control network that provides for establishing QoS requirements in order to guarantee the delivery of control traffic that considers both local and global views of the communication network.

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer generated step, logic block, process, etc., is here, and generally, conceived to be a self-consistent sequence of steps or instructions leading to a desired result. The steps are those requiring physical manipulations of physical quantities, and refer to the action and processes of a computing system, or the like, including a processor configured to manipulate and transform data represented as physical (electronic) quantities within the computer system's registers and memories into other data similarly represented as physical quantities within the computer system memories or registers or other such information storage, transmission or display devices.

Flowcharts of examples of methods for guaranteeing network control traffic are provided, according to embodiments of the present invention. Although specific steps are disclosed in the flowcharts, such steps are exemplary. That is, embodiments of the present invention are well-suited to performing various other steps or variations of the steps recited in the flowcharts. Also, embodiments described herein may be discussed in the general context of computer-executable instructions residing on some form of computer-readable storage medium, such as program modules, executed by one or more computers or other devices. By way of example, and not limitation, the software product may be stored in a nonvolatile or non-transitory computer-readable storage media that may comprise non-transitory computer storage media and communication media. Generally, program modules include routines, programs, objects, components, data structures, etc., that perform particular tasks or implement particular abstract data types. The functionality of the program modules may be combined or distributed as desired in various embodiments.

Figure 1:
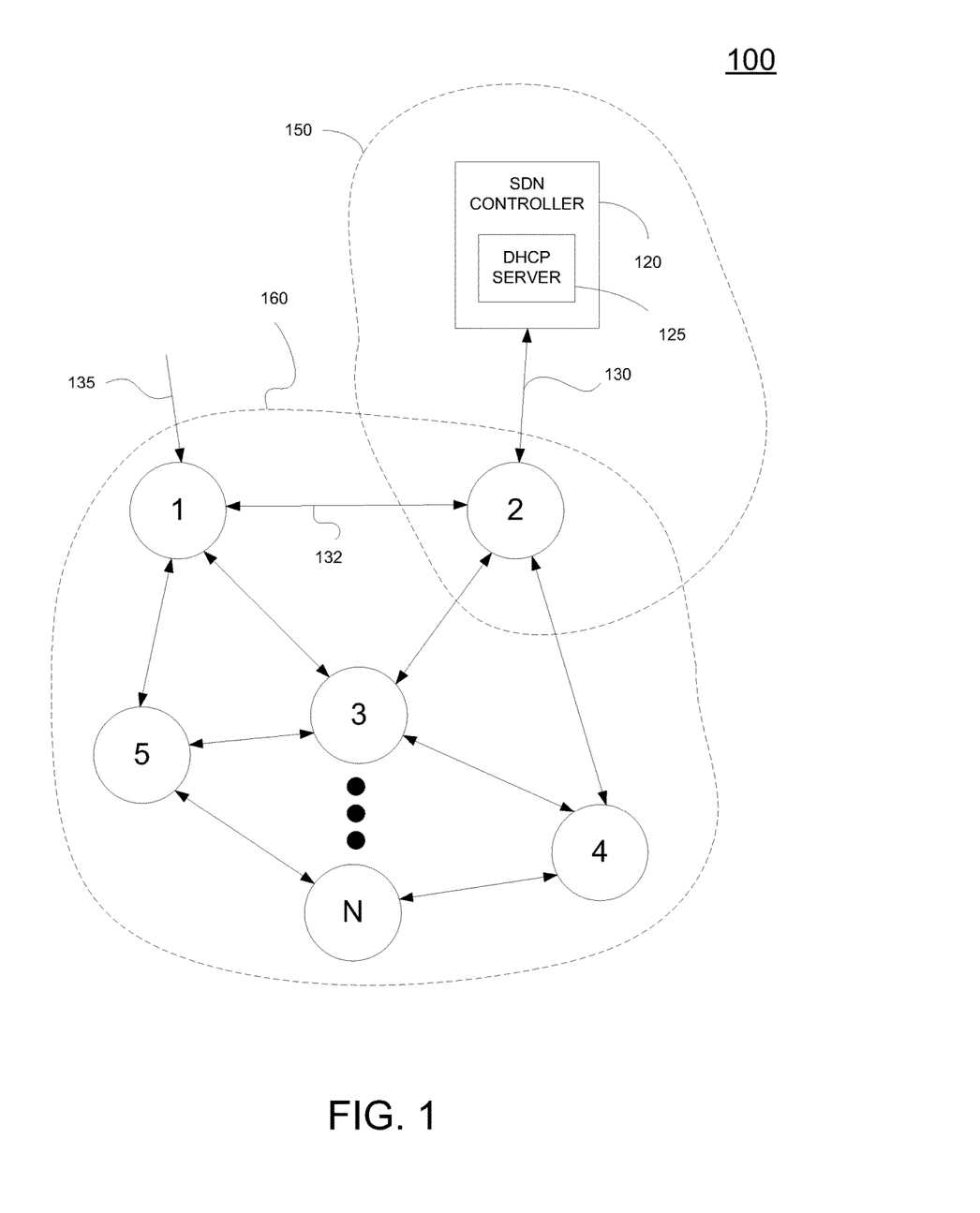
FIG. 1 is diagram of an in-band control network that is configured to guarantee delivery of control traffic, in accordance with one embodiment of the present disclosure.

FIG. 1 is diagram of an in-band control network 100 that is configured to guarantee delivery of control traffic, in accordance with one embodiment of the present disclosure. Network 100 includes a plurality of nodes 1-N that are communicatively coupled together in various configurations. In particular, nodes 1-N include packet forwarding devices configured to forward packets between nodes. For example, devices 1-N may be coupled in a local area network (LAN), or may be coupled across one or more LANs in a wide area network (WAN). Depending on the type of networking implemented, devices 1-N may include switches that provide packet forwarding between devices in a LAN, for example, or routers that provide packet forwarding between devices located in different networks (e.g., across multiple LANs or WANs).

In particular, network 100 implements software defined networking (SDN) that provides network services by decoupling the network management system from the data forwarding system. For example, a logical control plane is established so that control traffic may be delivered between any of the nodes 1-N and the SDN controller 120. SDN controller 120 is communicatively coupled to nodes 1-N, wherein SDN controller 120 is configured to manage network 100, such as using a networking protocol. In addition, SDN controller 120 may include a Dynamic Host Configuration Protocol (DHCP) server used to configure network 100, either at its creation or during its lifetime. The control plane is logically separate from the data plane formed by the underlying nodes 1-N used to forward traffic throughout network 100. Each of nodes 1-N in the control plane must initialize and maintain a connection to the SDN controller 120 across the control plane to keep the network 100 active.

Moreover, nodes 1-N are configured as SDN devices, such as SDN switches, SDN routers, etc. to be compatible with the networking protocol. For example, SDN network 100 uses an SDN protocol for communication between nodes 1-N of the network and SDN controller 120. For illustration, OpenFlow is an industrial accepted communication protocol that allows a remote SDN controller 120 to determine how packets are delivered between nodes 1-N in network 100. In addition, any packet forwarding device at nodes 1-N that is compatible with OpenFlow is able to be incorporated into network 100, such that different devices using different interfaces and internal scripting languages are able to be managed remotely by the SDN controller 120 via the OpenFlow protocol. In addition, OpenFlow allows for extensions on top of the provided management functionality that can be tailored to perform individualized functionality.

Control traffic to and from SDN controller 120 is used to create and manage network 100, such as providing the networking used to deliver control and data traffic. In particular, control traffic may be used to configure nodes 1-N, wherein configuration settings instruct each node how data should be forwarded from one node to another. For instance, control traffic delivered to one or more nodes may include packet forwarding information that define how incoming packets to a node should be forwarded to other nodes in the network, so that the packets will reach their destination nodes. Also, control traffic is used to deliver status and error messages to the SDN controller 120 from nodes 1-N.

The control traffic may be delivered through two types of networks: an out-of-band control network or an in-band control network. In the out-of-band control network (not shown), the control plane is physically separate from the data plane in that the control network includes its own physical network for passing control traffic. While an out-of-band control network is inherently less susceptible to QoS problems (e.g., congestion) than an in-band control network because of its dedicated physical network, the out-of-band control network may be prohibitive because of its added costs and network complexity. On the other hand, the in-band control network, such as network 100, uses the same physical network for delivering both control and data traffic. Further, embodiments of the present invention are able to guarantee the delivery of control traffic by establishing QoS requirements for control traffic across the in-band network 100, wherein the QoS requirements established considers both local and global views of network 100.

More particularly, the in-band control network 100 may include a dedicated communication path 130 between a selected node (packet forwarding device at node 2) and the SDN controller 120, wherein path 130 is used primarily for delivering control traffic. Outline 150 illustrates the portion of network 100 that is dedicated for delivering control traffic directly to and from SDN controller 120.

In the in-band control network, nodes 1-N utilize the data plane to deliver control traffic. For example, outline 160 illustrates the data plane network that communicatively couples packet forwarding devices located at nodes 1-N together so that data traffic is deliverable between the nodes. Data packets may be generated in association with each node (e.g., computing device attached or associated with a node), or may be introduced into network 100, such as through path 135 (e.g., incoming packet from another network).

In addition, control traffic is delivered from one node to another through the data plane, and is interfaced with SDN controller through the packet forwarding device at node 2. That is, control traffic delivered upstream to the SDN controller 120 originates at one of the nodes in outline 160, travels through one or more nodes until it reaches the packet forwarding device at node 2, and is ultimately delivered to SDN controller 120 via communication path 130. For example, a control message originating from the device at node 1 may travel directly to a device at node 2 over communication path 132, or may take a more indirect path by first traveling to one or more other nodes before reaching the device at node 2. Also, control traffic delivered downstream from the SDN controller 120 is delivered first to the device at node 2 before being forwarded to its destination node via one or more intermediate nodes in network 100.

Figure 2:
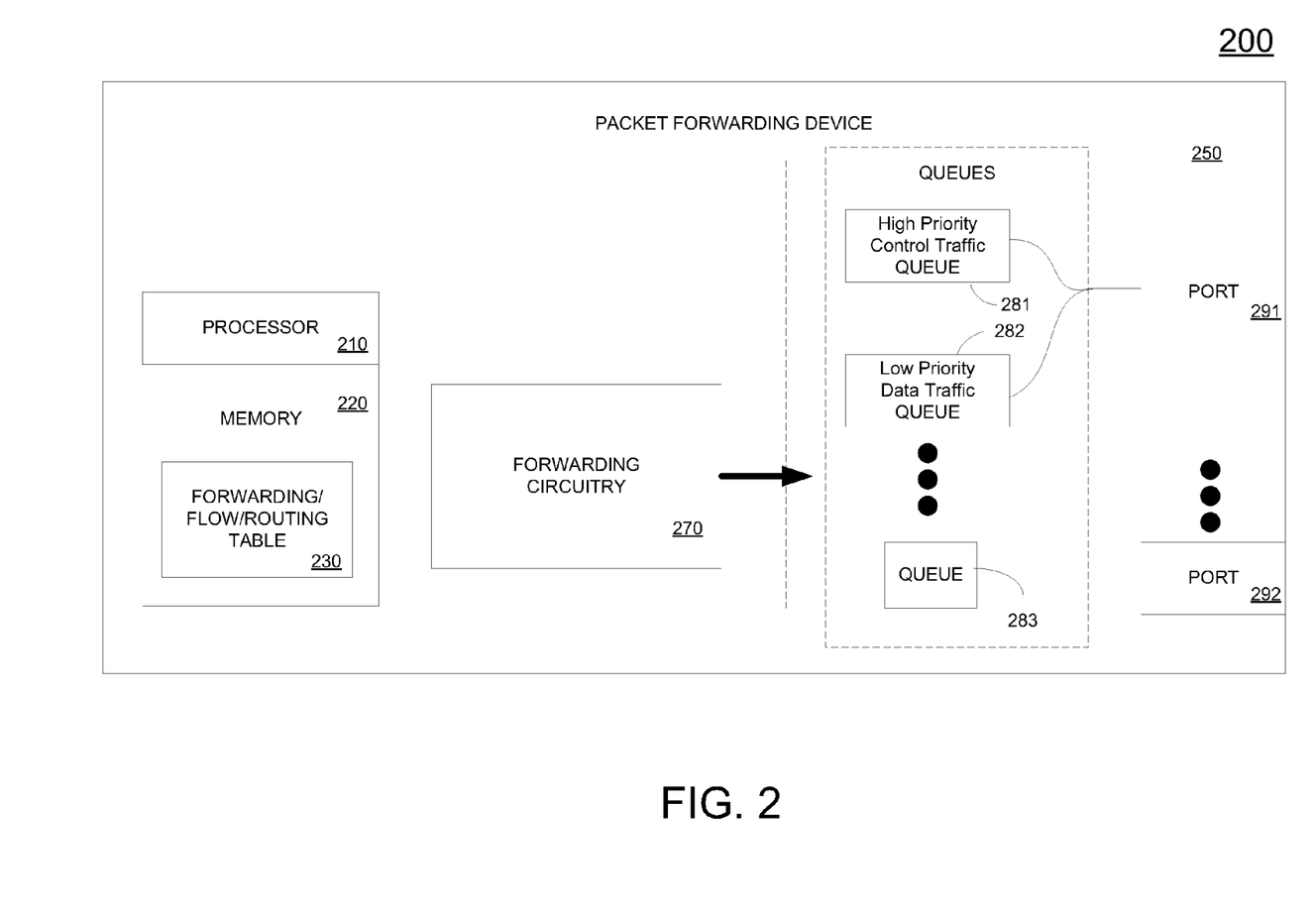
FIG. 2 is a block diagram of a packet forwarding device that is configured to establish quality of service (QoS) requirements in order to guarantee the delivery of control traffic over a communication path, in accordance with one embodiment of the present disclosure.

FIG. 2 is a block diagram of a packet forwarding device 200 that is configured to implement quality of service (QoS) requirements in order to guarantee the delivery of control traffic over a communication path, in accordance with one embodiment of the present disclosure. For example, device 200 may be implemented at one of the nodes 1-N in network 100 of FIG. 1.

Packet forwarding device 200 may include a processor 210 and memory 220, wherein the processor 210 is configured to execute computer-executable instructions stored in the memory 220. Processor 210 is configured to guarantee delivery of control traffic to and from device 200 over a corresponding network. For example, control traffic may be delivered from device 200 to a SDN controller, or may be receiving control traffic from SDN controller, or may be relaying control traffic received from one node to another node, or directly to the SDN controller. In one embodiment, the processor 210 is configured to perform the functions of one or more of the example embodiments described and/or illustrated herein, such as the operations performed by any of the devices at nodes 1-N. Further, the processor 210 may be included within a single or multi-processor computing device or system capable of executing computer-readable instructions. In its most basic form, a computing device may include at least one processor and a system memory. System memory is coupled to processor, and generally represents any type or form of volatile or non-volatile storage device or medium capable of storing data and/or other computer-readable instructions. Examples of system memory include, without limitation, random access memory (RAM), read only memory (ROM), Flash memory, or any other suitable memory device.

Memory 220 includes table 230 (hereinafter referred to as "forwarding table") that is used for forwarding packets from device 200 to other forwarding devices in a corresponding network. For example, table 230 may be a forwarding table, flow table, routing table, etc. In SDN devices of embodiments of the present invention, packet forwarding tables allow for remote management (including initial configuration and dynamic reconfiguration) using the OpenFlow protocol. For example, control traffic allows for adding, modifying, and removing of packet matching rules and action. As such, packet forwarding and/or routing decisions may be coordinated between the packet forwarding device 200 and a corresponding SDN controller and translated into rules and actions which are reflected in the forwarding table 230.

Packets with matching headers are handled by the forwarding circuitry 270 that implement the rules and actions stored in forwarding table 230. A new packet having an unmatched destination (e.g., no defined forwarding path exiting from device 200) in its header may be redirected (e.g., header and/or data) within control traffic to the corresponding SDN controller to create new rules and/or actions that define how the packet forwarding device 200 will forward the new packet. SDN controller may create new rules and/or actions at one or more packet forwarding devices in a corresponding network in order to handle the new, incoming packet. For example, returning control traffic may modify existing rules and/or actions or deploy new rules and/or actions in one or more packet forwarding devices of a corresponding network. As such, packet forwarding device 200 may modify its rules and/or actions stored in forwarding table 230 depending on the received control traffic from the SDN controller.

Processor 210 is configured to handle received control traffic and to communicate control traffic to a corresponding SDN controller. For example, processor 210 acts as an SDN agent. In addition, processor 210 is configured to guarantee control traffic messaging throughout a network by establishing QoS requirements upon initializing the packet forwarding device with configuration settings, and through dynamic modification of those configuration settings. Once the configuration settings associated with packet forwarding are set, packets are then handled by the forwarding circuitry for 270 for delivery to the correct port (e.g., 291, 292, etc.) via a plurality of queues 281, 282, 283, etc., for proper forwarding of the packets to other packet forwarding devices in the corresponding network. Forwarding circuit 270 may be an application specific integrated circuit (ASIC) or a field-programmable gate array (FPGA) device, or any other suitable circuit device, that is configured for quick processing (e.g., with low overhead) of packet forwarding functionality.

As part of guaranteeing control traffic QoS over a corresponding communication path associated with a corresponding port, processor 210 is configured to assign priorities to packets being handled by packet forwarding device 200. For example, processor 210 is configured to distinguish between packets that are control traffic or data traffic. In one embodiment, control traffic has a higher priority (e.g., high priority) over data traffic (e.g., low priority). This functionality may be incorporated into forwarding circuit 270, in one embodiment.

For example, by assigning priority to a packet handled by packet forwarding device 200, circuitry 270 is able to implement QoS requirements for control traffic. That is, forwarding circuitry 270 can determine which queue will be used to deliver that packet out of the device 200 over a communication path (e.g., hop) to the next packet forwarding device. This is accomplished by placing the packet into its proper queue according to its priority and determined port. As an illustration, if a control message is received or generated by packet forwarding device 200, the forwarding circuitry 270 is able to determine the proper port 291 according to the rules and/or actions in forwarding table 230, and place that packet into the high priority control traffic queue 281. Packets in high priority control traffic queue 281 are delivered to port 291 with a higher priority than data traffic stored in the low priority data traffic queue 282. Buffer management may be handled by a buffer controller (not shown) according to the QoS requirements set in the configuration settings for packet forwarding device 200.

Figure 3:
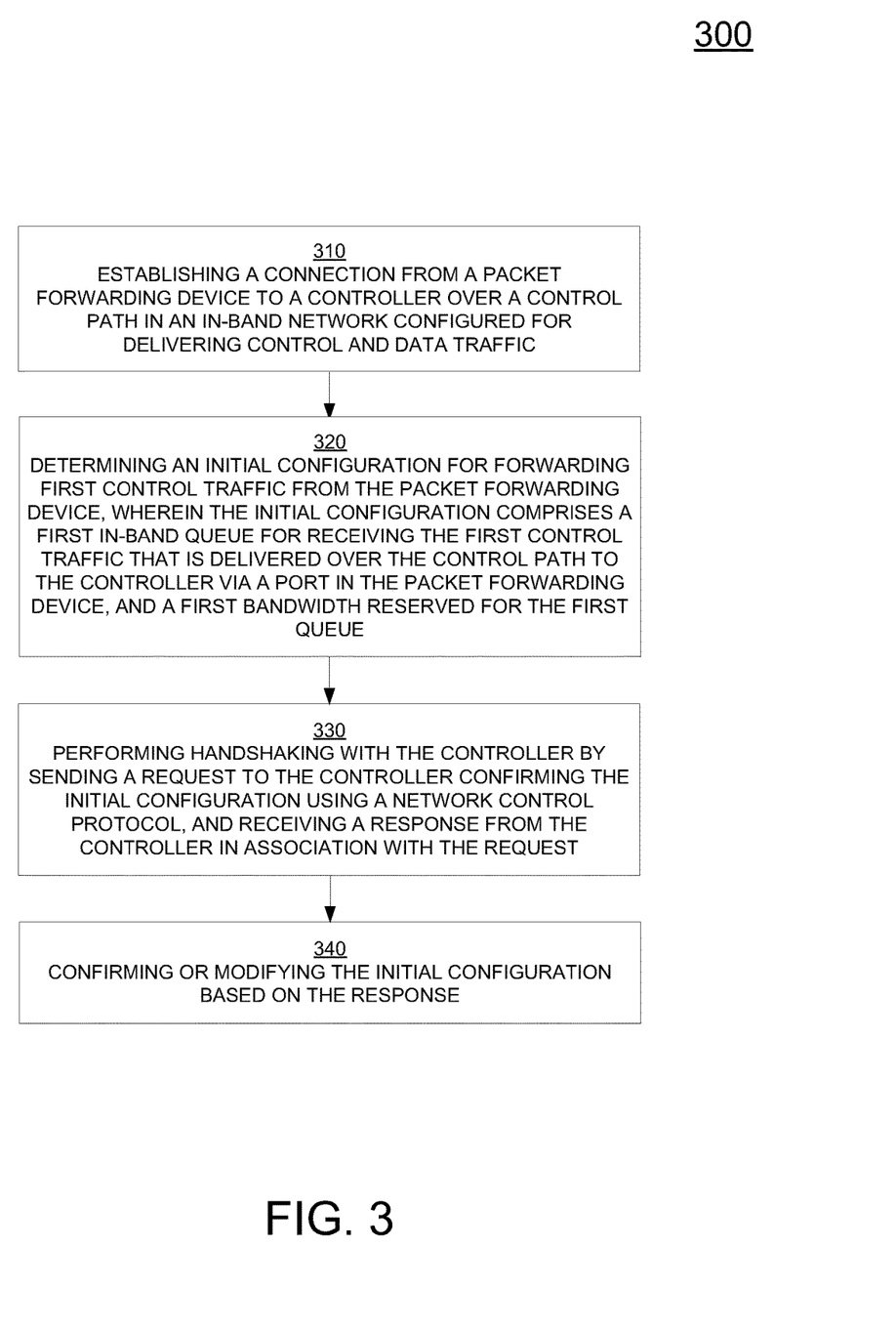
FIG. 3 is a flow diagram illustrating a method for guaranteeing the delivery of control traffic over a communication path that considers both local and global views of the communication network, in accordance with one embodiment of the present disclosure.

FIG. 3 is a flow diagram 300 illustrating a method for guaranteeing the delivery of control traffic over a communication path according to QoS requirements, in accordance with one embodiment of the present disclosure. In one embodiment, flow diagram 300 considers both local and global views of the communication network when implementing the QoS requirements. In one embodiment, flow diagram 300 illustrates a computer implemented method for guaranteeing the delivery of control traffic over a communication path according to QoS requirements. In another embodiment, flow diagram 300 is implemented within a computer system including a processor and memory coupled to the processor and having stored therein instructions that, if executed by the computer system causes the system to execute a method for guaranteeing the delivery of control traffic over a communication path according to QoS requirements. In still another embodiment, instructions for performing the method are stored on a non-transitory computer-readable storage medium having computer-executable instructions for causing a computer system to perform a method for guaranteeing the delivery of control traffic over a communication path according to QoS requirements. The operations of flow diagram 300 are implemented within the packet forwarding device 200 of FIG. 2, in some embodiments of the present disclosure.

At 310, the method includes establishing a connection from a packet forwarding device to a controller (e.g., SDN controller) over a control path in an in-band network configured for delivering control and data traffic. For example, the connection may be established during initiation of the device into the communication network (e.g., during power-up). This may involve a DHCP server at the SDN controller, wherein the DHCP server is able to remotely configure network configuration settings on packet forwarding devices in the network. As an illustration, the DHCP server is able to assign internet protocol (IP) addresses to the packet forwarding devices, define forwarding instructions between devices in the network (e.g., providing forwarding entries in forwarding tables), and in accordance with embodiments of the present invention provide configuration settings that guarantee control traffic delivery according to QoS requirements.

In one embodiment, the connection is established over an in-band control network. As such, control traffic is delivered from one packet forwarding device to another packet forwarding device over the same physical network (e.g., data plane) that handles the delivery of data traffic in the communication network.

At 320, the method includes determining an initial configuration used for forwarding first control traffic from the packet forwarding device. The initial configuration also implements QoS requirements for control traffic over a communication path in the in-band control network. The initial configuration may be established at power-up of the device, and when initializing the device to the communication network. In one embodiment, the initial configuration is stored into the packet forwarding device (e.g., in the forwarding table), such that the device is operational using the initial configuration. In another embodiment, the initial configuration is established and set in the device after authorization by the SDN controller.

In addition, the initial configuration may be established locally by the packet forwarding device. In that manner, localized networking states and status may be considered by the device. In another case, the initial configuration may be a default configuration.

In one embodiment, the initial configuration comprises a first in-band queue for receiving first control traffic that is delivered over a control path to the controller. The defined control path is associated with a communication path that is associated with a port in the packet forwarding device. That is, packets forwarded from the device over the communication path exit over a corresponding port. The first in-band queue buffers control commands before sending them to the corresponding port. In addition, the port connects to another port of another packet forwarding device located on the other end of the communication path.

The first in-band queue is selected from a plurality of queues coupled to the port. That is, the port may have one or more queues for buffering traffic that is delivered via the port. In addition, the communication channel for forwarding control and data traffic from the port has a total bandwidth. The total bandwidth may be related to the physical or network capabilities of the communication channel over which data and control traffic is delivered. For instance, a SDN controller may assign a maximum total bandwidth to that communication channel that is in compliance with an overall view of the corresponding communication network.

In addition, the port is also coupled to a second queue that is configured to receive data traffic for forwarding over the port. The in-band communication network is able to deliver both control and network traffic over the communication channel. To implement QoS for control traffic, the packet forwarding device includes one or more queues that store traffic according to their assigned priorities. For example, control traffic is assigned a high priority, and data traffic is assigned low priority, wherein the control traffic has a higher priority than data traffic. By assigning a higher priority to control traffic, and storing the control traffic in a separate queue or buffer than the data traffic, QoS requirements can be implemented for guaranteeing the delivery of control traffic.

For example, the initial configuration also includes a first bandwidth reserved for the first queue that buffers control traffic. That is, control traffic is assigned a first bandwidth taken from the total bandwidth over the communication path between the packet forwarding device and another packet forwarding device. By varying the value of the first bandwidth, QoS requirements are implemented for guaranteeing delivery of control traffic over the communication path via the corresponding port. For example, this first bandwidth is implemented through message control of the packets in the first queue (e.g., for control traffic) and the second queue (e.g., for data traffic). That is, a buffer controller can direct traffic to the port from the two queues to ensure QoS requirements associated with the delivery of control traffic.

In one embodiment, the control traffic may have gradations of priorities. That is, types of control traffic may be assigned different priorities. Also, these varying priorities are each associated with a different queue. Further, QoS requirements may be determined and implemented for each of the different types of control traffic by managing the delivery of the control traffic through the corresponding port.

At 330, the method includes performing handshaking with the SDN controller by sending a request to the controller confirming the initial configuration using a network control protocol. During the handshaking process, the method includes receiving a response from the SDN controller in association with the request.

At 340, the method includes confirming or modifying the initial configuration based on the response. For example, in one case, the response includes a confirmation of the initial configuration, and as such, the method includes receiving a confirmation at the packet forwarding device of the initial configuration. As such, in one case the packet forwarding device need not modify the configuration settings that are stored in the forwarding table. If the configuration settings have not been fully implemented awaiting authorization from the SDN controller, the configuration settings are initialized by the packet forwarding device, such as being stored in the forwarding table.

In another case, when performing the handshaking by modifying the initial configuration, the method includes receiving a rejection of the initial configuration in the response. In this case, the response does not include any recommended configuration settings. As such, the method includes resending the request by the packet forwarding device for confirmation of the initial configuration, and in the interim period following the initial configuration settings as established locally by the packet forwarding device in order to forward packets according to QoS requirements. The new request is delivered after a period of time that is set by the SDN controller, or is determined by the packet forwarding device.

In still another case, when performing the handshaking to modify the initial configuration, the method includes receiving a rejection of said initial configuration in the response. In this case, the response also includes an alternative configuration. As such, the method includes programming the packet forwarding device programs with the alternative configuration. For example, the alternative configuration is stored into the forwarding table of the packet forwarding device.

Figure 4:
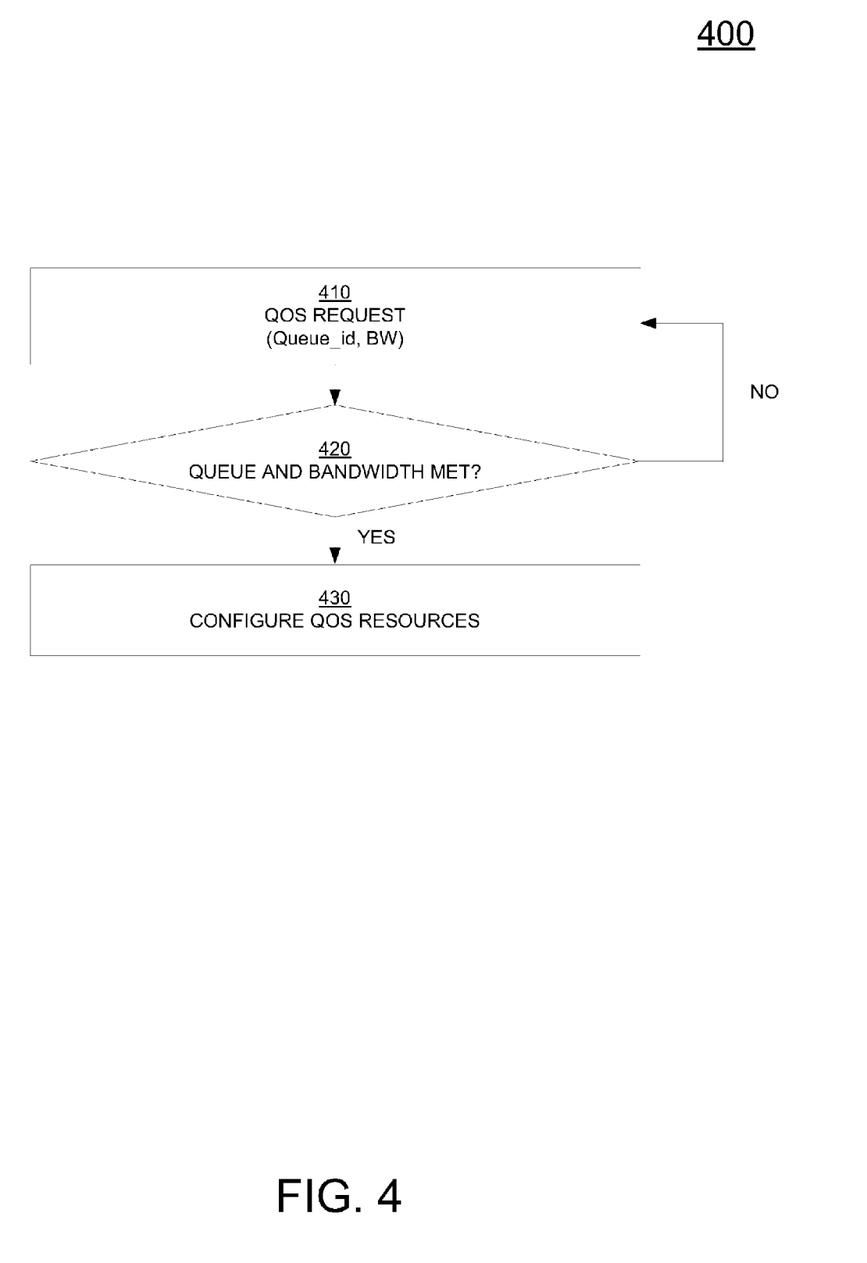
FIG. 4 is a flow diagram illustrating a handshaking process performed to establish QoS requirements for control traffic over a communication path, in accordance with one embodiment of the present disclosure.

FIG. 4 is a flow diagram 400 implementing a handshaking process performed to establish QoS requirements for control traffic over a communication path, in accordance with one embodiment of the present disclosure. In one embodiment, flow diagram 400 illustrates a computer implemented method for implementing a handshaking process performed to establish QoS requirements for control traffic over a communication path. In another embodiment, flow diagram 400 is implemented within a computer system including a processor and memory coupled to the processor and having stored therein instructions that, if executed by the computer system causes the system to execute a method for implementing a handshaking process performed to establish QoS requirements for control traffic over a communication path. In still another embodiment, instructions for performing the method are stored on a non-transitory computer-readable storage medium having computer-executable instructions for causing a computer system to perform a method for implementing a handshaking process performed to establish QoS requirements for control traffic over a communication path. The operations of flow diagram 400 are implemented within the packet forwarding device 200 of FIG. 2, in some embodiments of the present disclosure. In one embodiment, flow diagram 400 is implemented at the initialization stage of the packet forwarding device. Further, flow diagram 400 may further describe the initial configuration determination and handshaking operations 320 and 330 of FIG. 3.

As shown, at 410, a QoS request is generated. The QoS request includes a default queue and a minimum bandwidth allocation for the default queue that comprises an initial configuration, at least for establishing QoS requirements. The default queue is associated with an identification (e.g., SUPER_QUEUE_ID). The initial minimal bandwidth allocation may be designated by a "Init Bandwidth Ctrl" value.

At 420, the QoS request is delivered to the SDN controller during a handshaking stage after a connection is established with the SDN controller (e.g., through a DHCP process). The QoS request from the packet forwarding device is asking for confirmation and/or modification of the requested queue and bandwidth allocation. In particular, the SDN controller may return a range of bandwidth values over which the packet forwarding device may reserve bandwidth for delivering control traffic over a corresponding communication path. The range of bandwidth values is determined by the SDN controller by considering the current overview of the overall topology of the network, and its current states or status for handling traffic. As such, the packet forwarding device is configured to determine if the bandwidth allocated in the initial configuration falls within the range of bandwidth values authorized by the SDN controller.

If the bandwidth allocated does not meet the authorized range, then the process returns back to 410, wherein the QoS request is redelivered without modification to the initial configuration, or with a modification to the initial configuration. For example, if the minimum bandwidth is less than the requested bandwidth, then the packet forwarding device may decline the bandwidth range in the reply, and resend the request with the initial configuration at a later period.

On the other hand, if the bandwidth allocated meets the authorized range, then the process continues to 430, wherein the QoS resources are confirmed. If the configuration settings have not been fully configured, then the configuration settings may be fully programmed into the packet forwarding device. In one embodiment, the packet forwarding device has full control over the bandwidth allocated to the delivery of control traffic over the communication path, such that the device may modify the bandwidth allocation (e.g., associated with the queue buffering the control messages) anywhere within the authorized bandwidth range established by the SDN controller.

Figure 5:
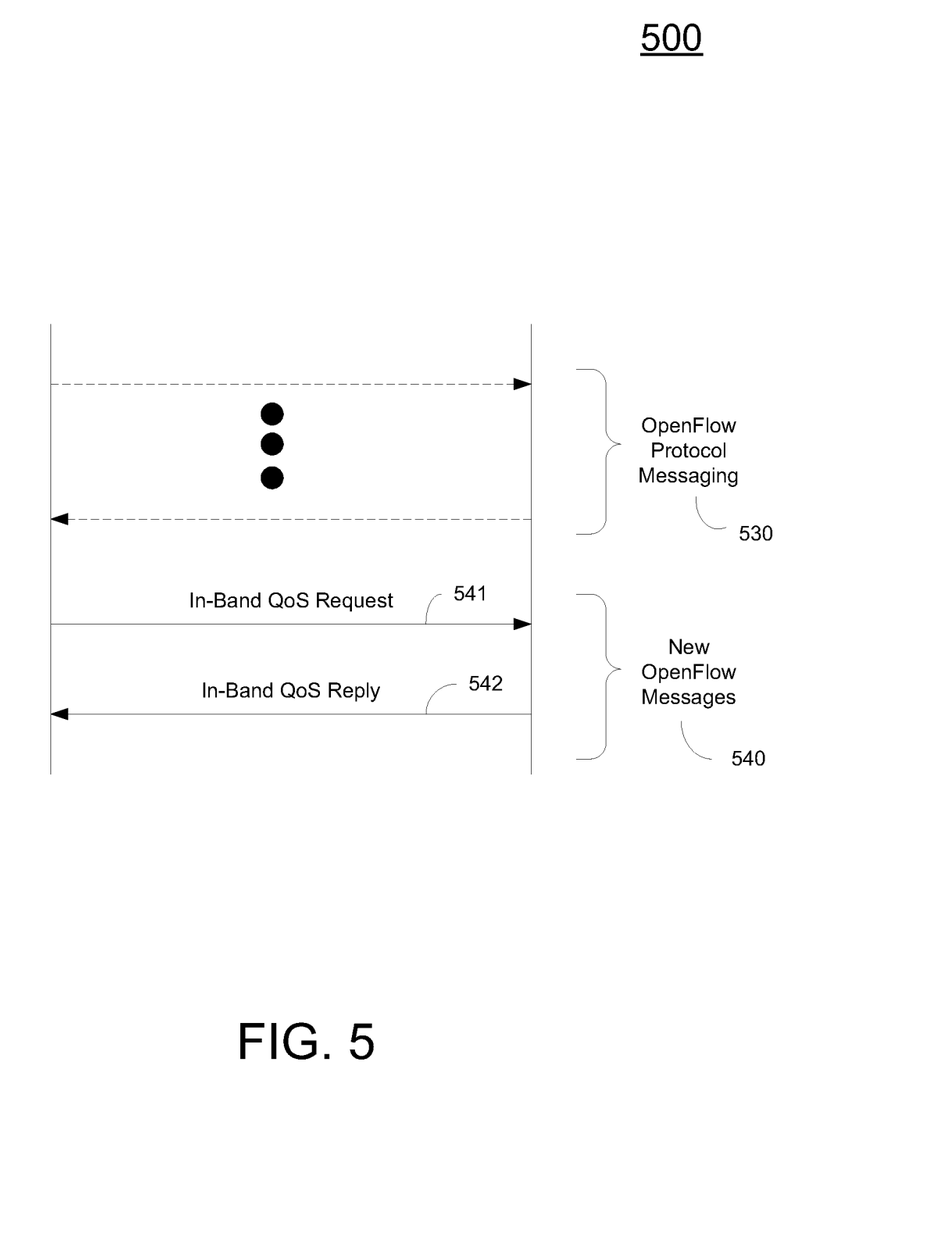
FIG. 5 is a message flow diagram illustrating the extension of the OpenFlow protocol to establish QoS requirements for control traffic over a communication path, in accordance with one embodiment of the present disclosure.

FIG. 5 is a flow diagram illustrating the extension of the OpenFlow protocol to establish QoS requirements for control traffic over a communication path, in accordance with one embodiment of the present disclosure. In one embodiment, flow diagram 500 illustrates a computer implemented method for implementing the extension of the OpenFlow protocol to establish QoS requirements for control traffic over a communication path. In another embodiment, flow diagram 500 is implemented within a computer system including a processor and memory coupled to the processor and having stored therein instructions that, if executed by the computer system causes the system to execute a method for implementing the extension of the OpenFlow protocol to establish QoS requirements for control traffic over a communication path. In still another embodiment, instructions for performing the method are stored on a non-transitory computer-readable storage medium having computer-executable instructions for causing a computer system to perform a method for implementing the extension of the OpenFlow protocol to establish QoS requirements for control traffic over a communication path. The operations of flow diagram 500 are implemented within the packet forwarding device 200 of FIG. 2, in some embodiments of the present disclosure. In one embodiment, flow diagram 500 is implemented at the handshaking and initialization stages of the packet forwarding device, such as the initial configuration determination and handshaking operations 320 and 330 of FIG. 3.

The messages shown in FIG. 5 are delivered between a packet forwarding device and an SDN controller. For example, as shown in FIG. 5, an OpenFlow networking protocol is used to initialize a packet forwarding device (e.g., a switch) with initial configuration settings. An OpenFlow protocol messaging sequence 530 is performed between the packet forwarding device, receiving and sending messages on the left, and SDN controller, receiving and sending messages on the right, to initialize the packet forwarding device within the network. For example, these may be standard OpenFlow protocol operations used to initialize the packet forwarding device.

In addition, the OpenFlow protocol allows for extensions to be applied, so that new functionality may be implemented within the network, such as establishing QoS requirements for the delivery of control traffic over a communication path. For example, new OpenFlow messages 540 may be performed to include sending an in-band QoS request 541 from the packet forwarding device to the SDN controller. The QoS request was previously described in relation to FIGS. 3 and 4, and includes the queue requested for delivering control traffic over the communication path, and a requested allocation of bandwidth for the control traffic over the communication path.

In particular, the SDN controller receives the in-band QoS request at 541, and determines if the proposed queue (referred to as queue_id) is appropriate. In addition, the SDN controller may determine a range of bandwidth to allocate over the communication path for delivering control traffic. The bandwidth range may be determined by considering overall traffic flow throughout the network. In one case, the minimum bandwidth is the bandwidth included in the QoS request.

In addition, the new OpenFlow messages 540 may include receiving an in-band QoS reply 542 from the SDN controller at the packet forwarding device. In one embodiment, the reply includes the proper queue to use for buffering control traffic delivered over the communication path. The reply may also include the range of bandwidth allowed for delivering control traffic over the communication path. The range may include a minimum to maximum bandwidth.

As previously described, the packet forwarding device accepts, rejects, or modifies the initial configuration according to the response delivered by the SDN controller. For instance, if the bandwidth requested falls outside of the authorized range, then the packet forwarding device may reject the bandwidth recommended, and resend the QoS request at a later time. In addition, if the requested bandwidth is within the authorized range, the packet forwarding device may accept the allocated bandwidth initially requested, or modify the bandwidth allocation for delivering control traffic over the communication path to any bandwidth within the authorized range.

In still another embodiment, dynamic adjustment of the configuration settings may be performed by either the packet forwarding device or the SDN controller. For example, the bandwidth allocated for control traffic over the communication path may be dynamically adjusted either by the device or SDN controller.

In particular, the packet forwarding device may receive a control message from the SDN controller, wherein the control message includes a new configuration for forwarding the control traffic from the device over the communication path. The SDN controller may determine that new configuration settings are necessary by considering a global view of network traffic throughout the communication network. As such, the new configuration settings are used to reprogram the packet forwarding device.

In another scenario, the packet forwarding device may determine that a desired configuration for forwarding control traffic over the communication path is necessary. The desired configuration may be determined based on a history of control and data traffic handled by the packet forwarding device. That is, the packet forwarding device is able to consider local traffic information when generating the desired configuration. The desired configuration may be packaged within another QoS request that is delivered to the SDN controller for confirmation. A response is generated by the SDN controller and delivered to the packet forwarding device. The response is received by the packet forwarding device from the controller in association with the QoS request. As such, the desired configuration settings may be used to reprogram the packet forwarding device when receiving in the response a confirmation of the desired configuration originally contained in the QoS request. This request and confirmation process may follow the operations outlined in FIGS. 3-5.

Figure 6:
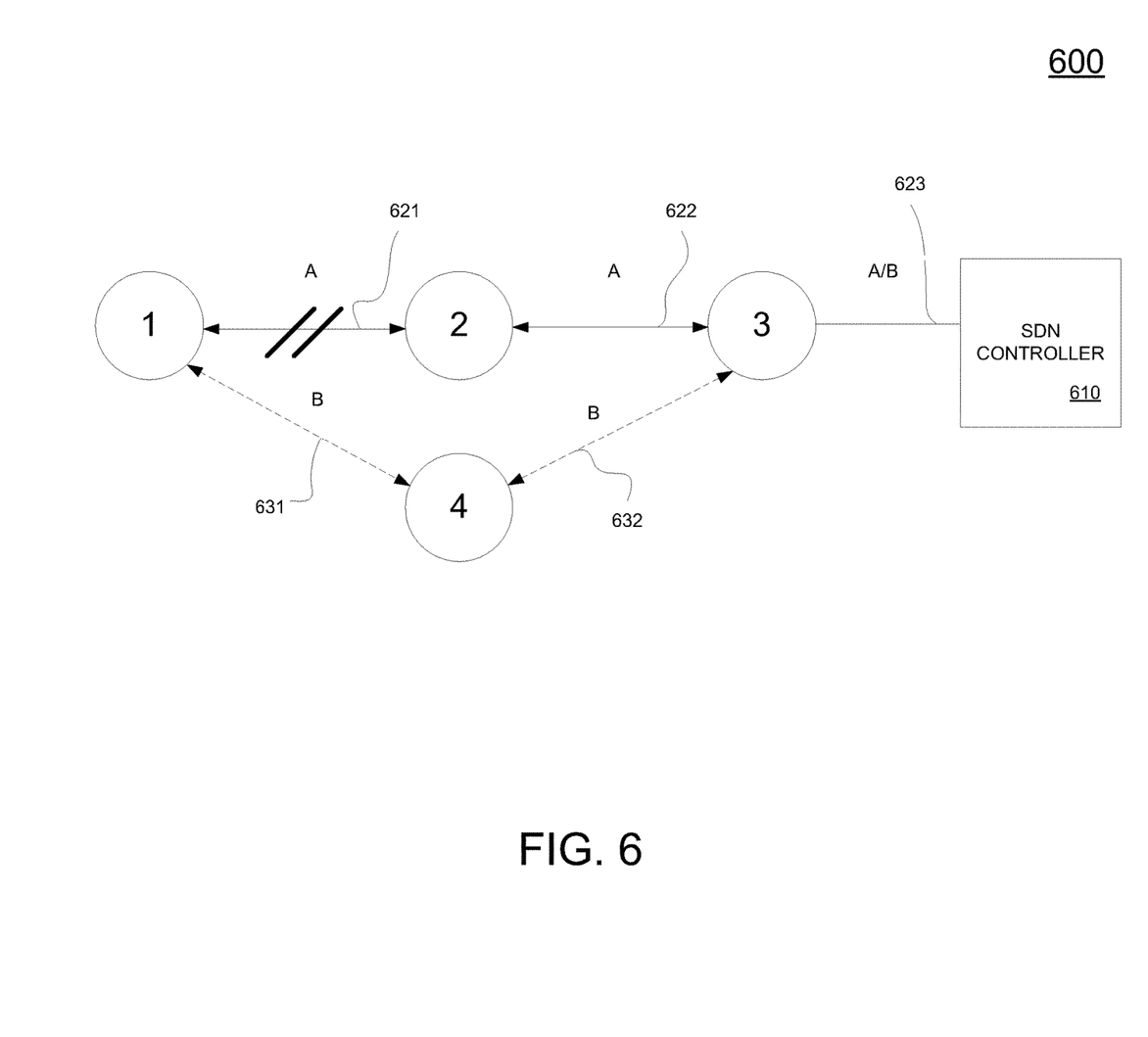
FIG. 6 is a diagram illustrating a failover process that includes establishing QoS requirements for control traffic over a failover communication path, in accordance with one embodiment of the present disclosure.

FIG. 6 is a diagram illustrating a failover process that includes establishing QoS requirements for control traffic over the failover communication path in a communication network 600, in accordance with one embodiment of the present disclosure. Network 600 may include packet forwarding devices located at nodes 1-4, and a SDN controller 610. Network 600 may include an in-band control network that delivers control traffic (e.g., control plane) over the same physical network used to device data traffic (e.g., data plane).

The failover process is an illustration of the dynamic adjustment of the configuration settings that is initiated by the packet forwarding device. For example, an initial configuration for device at node 1 may include a control path A that is used to communicate control traffic to the SDN controller 610 from the device at node 1. From the device at node 1, control path A includes a hop between the devices at nodes 1 and 2 over path 621, another hop between devices at nodes 2 and 3 over path 622, and a final, dedicated hop between the device at node 3 and the SDN controller 610 over path 623. During failover, the device at node 1 may detect that the hop between devices at nodes 1 and 2 has failed, and during the failover process switches over to control path B. From the device at node 1, control path B includes a hop between devices at nodes 1 and 4 over path 631, another hop between devices at nodes 3 and 4 path 632, and a final, dedicated hop between the device at node 3 and the SDN controller 610 over path 623.

For dynamic adjustment, the packet forwarding device at node 1 may generate a failover configuration that is immediately implemented within the device. However, the SDN controller must be notified of the failover configuration. This is necessary to reduce conflicts over the new failover path. For example, if the SDN controller is not notified, it may improperly use either the device at node 1 or the device at node 4 according to an outdated understanding of the traffic flow over the communication path 631. As such, the failover configuration may be packaged within another QoS request that is delivered to the SDN controller for confirmation. A response is generated by the SDN controller and delivered to the packet forwarding device at node 1. The response is received by the packet forwarding device at node 1 from the controller in association with the QoS request. As such, the failover configuration may be used to reprogram the packet forwarding device at node 1 when receiving in the response a confirmation of the failover configuration originally contained in the QoS request. This request and confirmation process may follow the operations outlined in FIGS. 3-5.

Thus, according to embodiments of the present disclosure, systems and methods are described for guaranteeing the delivery of control traffic in an in-band control network.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

Although the present invention and its advantages have been described in detail, it should be understood that various changes, substitutions, and alterations can be made herein without departing from the spirit and scope of the invention as defined by the appended claims. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Embodiments according to the present disclosure are thus described. While the present disclosure has been described in particular embodiments, it should be appreciated that the disclosure should not be construed as limited by such embodiments, but rather construed according to the below claims.

The invention claimed is:

1. A computer system, comprising:
a processor configured to:
  establish a connection from a packet forwarding device to a controller over a control path in an in-band network configured for delivering control and data traffic;
  determine an initial configuration for forwarding first control traffic from said packet forwarding device, wherein said initial configuration comprises a first in-band queue for receiving said first control traffic that is delivered over said control path to said controller via a port in said packet forwarding device, and a first bandwidth reserved for said first queue;
  perform handshaking with said controller by sending a request to said controller confirming said initial configuration using a network control protocol, and receiving a response from said controller in association with said request; and
  confirm or modify said initial configuration based on said response.

2. The computer system of claim 1, wherein said processor configured to determine an initial configuration is further configured to:
select said first queue from a plurality of queues coupled to said port, wherein a communication channel for forwarding control and data traffic from said port has a total bandwidth, wherein said port is also coupled to a second queue configured to receive data traffic for forwarding over said port.

3. The computer system of claim 1, wherein said processor configured to perform handshaking is further configured to:
receive a confirmation of said initial configuration in said response.

4. The computer system of claim 1, wherein said processor configured to perform handshaking is further configured to:
receive a rejection of said initial configuration in said response; and
resend said request for confirming said initial configuration after a period of time.

5. The computer system of claim 1, wherein said processor configured to perform handshaking is further configured to:
receive a rejection of said initial configuration in said response, wherein said response comprises an alternative configuration; and
program said packet forwarding device with said alternative configuration.

6. The computer system of claim 1, wherein said processor is configured to:
receive a control message from said controller, wherein said control message comprises a new configuration for forwarding said first control traffic; and
program said packet forwarding device with said new configuration.

7. The computer system of claim 1, wherein said processor is configured to:
determine a desired configuration for forwarding first control traffic based on a history of control and data traffic handled by said packet forwarding device;
send a second request to said controller confirming said desired configuration;
receive a second response from said controller in association with said second request; and
program said packet forwarding device with said desired configuration when receiving a confirmation of said desired configuration in said second response.

8. The computer system of claim 1, wherein said network control protocol comprises an OpenFlow protocol.

9. The computer system of claim 1, wherein said packet forwarding device comprises a switch.

10. The computer system of claim 1, wherein said processor is configured to:
determine that said control path has failed;
select an alternative control path based on a failover configuration for forwarding said first control traffic, wherein said failover configuration comprises a second in-band queue for receiving said first control traffic that is delivered over said alternative control path to said controller via a second port in said packet forwarding device, and a second bandwidth reserved for said second in-band queue;
perform handshaking with said controller by sending a second request to said controller confirming said failover configuration using said network control protocol, and receiving a second response from said controller in association with said second request; and
confirm or modify said failover configuration based on said second response.

11. A method executed by a processor configured to guarantee control traffic throughput in a network, comprising:
establishing a connection from a packet forwarding device to a controller over a control path in an in-band network configured for delivering control and data traffic;
determining an initial configuration for forwarding first control traffic from said packet forwarding device, wherein said initial configuration comprises a first in-band queue for receiving said first control traffic that is delivered over said control path to said controller via a port in said packet forwarding device, and a first bandwidth reserved for said first queue;
performing handshaking with said controller by sending a request to said controller confirming said initial configuration using a network control protocol, and receiving a response from said controller in association with said request; and
confirming or modifying said initial configuration based on said response.

12. The method of claim 11, wherein said determining an initial configuration comprises:
selecting said first queue from a plurality of queues coupled to said port, wherein a communication channel for forwarding control and data traffic from said port has a total bandwidth, wherein said port is also coupled to a second queue configured to receive data traffic for forwarding over said port.

13. The method of claim 11, wherein said performing handshaking comprises:
receiving a confirmation of said initial configuration in said response.

14. The method of claim 11, wherein said performing handshaking further comprises:
receiving a rejection of said initial configuration in said response, wherein said response comprises an alternative configuration; and
programming said packet forwarding device with said alternative configuration.

15. The method of claim 11, further comprising:
receiving a control message from said controller, wherein said control message comprises a new configuration for forwarding said first control traffic; and
programming said packet forwarding device with said new configuration.

16. The method of claim 11, further comprising:
determining a desired configuration for forwarding first control traffic based on a history of control and data traffic handled by said packet forwarding device;
sending a second request to said controller confirming said desired configuration;
receiving a second response from said controller in association with said second request; and
programming said packet forwarding device with said desired configuration when receiving a confirmation of said desired configuration in said second response.

17. A non-transitory computer-readable medium having computer-executable instructions for causing a computer system to perform a method, comprising:
establishing a connection from a packet forwarding device to a controller over a control path in an in-band network configured for delivering control and data traffic;
determining an initial configuration for forwarding first control traffic from said packet forwarding device, wherein said initial configuration comprises a first in-band queue for receiving said first control traffic that is delivered over said control path to said controller via a port in said packet forwarding device, and a first bandwidth reserved for said first queue;
performing handshaking with said controller by sending a request to said controller confirming said initial configuration using a network control protocol, and receiving a response from said controller in association with said request; and
confirming or modifying said initial configuration based on said response.

18. The computer-readable medium of claim 17, wherein said performing handshaking in said method further comprises:

receiving a rejection of said initial configuration in said response, wherein said response comprises an alternative configuration; and programming said packet forwarding device with said alternative configuration.

19. The computer-readable medium of claim 17, wherein said method further comprises:

receiving a control message from said controller, wherein said control message comprises a new configuration for forwarding said first control traffic; and programming said packet forwarding device with said new configuration.

20. The computer-readable medium of claim 17, wherein said method further comprises:

determining a desired configuration for forwarding first control traffic based on a history of control and data traffic handled by said packet forwarding device;

sending a second request to said controller confirming said desired configuration;

receiving a second response from said controller in association with said second request; and programming said packet forwarding device with said desired configuration when receiving a confirmation of said desired configuration in said second response.

* * * * *

UNITED STATES PATENT AND TRADEMARK OFFICE
CERTIFICATE OF CORRECTION

PATENT NO. : 9,680,762 B2
APPLICATION NO. : 14/589248
DATED : June 13, 2017
INVENTOR(S) : Li et al.

Page 1 of 3

It is certified that error appears in the above-identified patent and that said Letters Patent is hereby corrected as shown below:

In the Drawings

Please delete Fig 2 and Fig 4 and replace with attached Fig 2 and Fig 4

Signed and Sealed this
Thirtieth Day of July, 2019

Andrei Iancu
*Director of the United States Patent and Trademark Office*